(12) United States Patent
Muthuramalingam et al.

(10) Patent No.: US 12,718,641 B2
(45) Date of Patent: Aug. 25, 2026

(54) ARTIFICIAL INTELLIGENCE BADGING SYSTEM

(71) Applicant: Honeywell International Inc., Charlotte, NC (US)

(72) Inventors: Marimuthu Vivek Muthuramalingam, Tamil Nadu (IN); Balaji Sivakumar Bhathey, Tami Nadu (IN); David Santhiyagu, Tamil Nadu (IN); Malathy Gurusamy, Tamil Nadu (IN); Puja Pratap Sirsath, Maharashtra (IN); Crosbi Win Samuel A, Tamil Nadu (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/938,000

(22) Filed: Nov. 5, 2024

(65) Prior Publication Data

US 2026/0127926 A1 May 7, 2026

(51) Int. Cl.
*G07C 9/20* (2020.01)
*G06F 40/174* (2020.01)

(52) U.S. Cl.
CPC ............. *G07C 9/20* (2020.01); *G06F 40/174* (2020.01)

(58) Field of Classification Search
CPC ................................ G07C 9/20; G06F 40/174
See application file for complete search history.

(56) References Cited

U.S. PATENT DOCUMENTS 8,234,704 B2 7/2012 Ghai et al.
9,767,228 B2 9/2017 Chen et al.
11,775,938 B2 10/2023 Ma et al.
2018/0341778 A1 11/2018 Florentino et al.
2022/0114522 A1 4/2022 Cardoso et al.
2023/0274232 A1* 8/2023 Botla ............. G06Q 10/063112 705/7.26
2024/0078337 A1 3/2024 Kamyshenko et al.
2024/0330421 A1* 10/2024 Ailawadi ................ G06F 21/31
(Continued)

FOREIGN PATENT DOCUMENTS

KR 10-2023-0167219 A 12/2023
WO 2018007774 A1 1/2018

OTHER PUBLICATIONS

Genetec (Trademark), “Secure Badge Design and Issuance”, 2023, 2 pages.

(Continued)

*Primary Examiner* — Sonji N Johnson
(74) *Attorney, Agent, or Firm* — Seager, Tufte & Wickhem, LLP

(57) ABSTRACT

A new badge for a user of a facility may be generated to physically access one or more areas of a facility. A Large Language Model (LLM) may be provided with access to one or more databases associated with the facility. The LLM may be prompted to automatically complete at least part of a badge request form for the new or renewed badge for the user of the facility, wherein the badge request form, once completed and approved, authorizes activation of the new or renewed badge for the user of the facility. The LLM may automatically populate at least part of the badge request form by extracting respective information from the one or more databases associated with the facility.

17 Claims, 4 Drawing Sheets

(56) References Cited

U.S. PATENT DOCUMENTS

| | | | | |
|---|---|---|---|---|
| 2025/0103797 | A1* | 3/2025 | Wisoff | G06F 16/345 |
| 2025/0174013 | A1* | 5/2025 | Baur | G06T 7/70 |
| 2025/0278768 | A1* | 9/2025 | Neumann | G06Q 30/018 |
| 2025/0299133 | A1* | 9/2025 | Sen | G06N 20/00 |

OTHER PUBLICATIONS

Sahra Ghalebikesabi et al, "Operationalizing Contextual Integrity in Privacy-Conscious Assistants", arxiv.org Cornell University Library, 201 Olin Library Cornell University Ithaca, NY 14853, Sep. 13, 2024 (Sep. 13, 2024).

* cited by examiner

THE LLM AUTOMATICALLY POPULATING THE ACCESS RIGHTS FIELD OF THE BADGE REQUEST FORM FOR THE USER WITH ASSESS RIGHTS THAT ARE DERIVED AT LEAST IN PART FROM THE PRIOR ACCESSES BY THE ONE OR MORE SUPERVISORS AND/OR THE PRIOR ACCESSES OF ONE OR MORE OF THE COWORKERS OF THE USER, WHERE THE ONE OR MORE DATABASES INCLUDE ACCESS LOGS THAT LOG PRIOR ACCESSES BY THE ONE OR MORE SUPERVISORS AND/OR THE ONE OR MORE OF THE COWORKERS OF THE USER ~40

THE LLM AUTOMATICALLY POPULATING THE ACCESS RIGHTS FIELD FOR THE USER WITH ASSESS RIGHTS THAT ARE DERIVED AT LEAST IN PART FROM THE PRIOR ACCESSES OF THE USER AS STORED IN ACCESS LOGS INCLUDED IN THE ONE OR MORE DATABASES ~42

THE LLM AUTOMATICALLY POPULATING THE ACCESS RIGHTS FIELD FOR THE USER WITH ASSESS RIGHTS THAT ARE DERIVED AT LEAST IN PART FROM THE COMMUNICATION LOGS BETWEEN USERS OF THE FACILITY, WHERE THE ONE OR MORE DATABASES INCLUDE COMMUNICATION LOGS THAT LOG COMMUNICATIONS BETWEEN USERS OF THE FACILITY ~44

THE LLM AUTOMATICALLY SUGGESTING CHANGES TO ONE OR MORE OF THE INFORMATION FIELDS OF THE BADGE REQUEST FORM BASED AT LEAST IN PART ON ONE OR MORE OF THE INFORMATION FIELDS OF PRIOR AUTHORIZED BADGE REQUESTS FORMS, WHERE THE ONE OR MORE DATABASES INCLUDE INFORMATION FIELDS FROM PRIOR AUTHORIZED BADGE REQUESTS FORMS ~46

PROMPTING THE LLM TO ESTIMATE A WORKLOAD FOR GENERATING NEW AND/OR RENEWED BADGES OVER A FUTURE TIME PERIOD BASED AT LEAST IN PART ON THE ACCESS RIGHTS EXPIRATION TIME FOR EACH OF THE AUTHORIZED USER OF THE FACILITY, WHERE THE ONE OR MORE DATABASES INCLUDE AN ACCESS RIGHTS EXPIRATION TIME FOR EACH AUTHORIZED USER OF THE FACILITY ~48

PROMPTING THE LLM TO ESTIMATING A RATE AT WHICH BADGES CAN BE PROCESSES BASED AT LEAST IN PART ON THE ACCESS BADGE ACTIVATION TIME FOR AT LEAST SOME OF THE AUTHORIZED USERS OF THE FACILITY, WHERE THE ONE OR MORE DATABASES INCLUDE AN ACCESS BADGE ACTIVATION TIME FOR EACH AUTHORIZED USER OF THE FACILITY ~50

FIG. 2B

ARTIFICIAL INTELLIGENCE BADGING SYSTEM

TECHNICAL FIELD

The present disclosure relates generally to badging systems for providing badges to access secure facilities. More particularly, the present disclosure relates to using artificial intelligence to help automate the creation of badges in a badging system.

BACKGROUND

In a conventional badging system, the process of issuing badges to users is heavily reliant on human input, which can increase the likelihood of errors. This also hinders the efficiency of badging operators and reduces their capacity to handle the volume of badges that often need to be issued within a specific timeframe. Conventional badging systems suffer from inefficiencies and potential risks due to heavy reliance on manual processes. In some facilities, the high volume of daily badge issuance can exacerbate these challenges, leading to errors, delays, and increased vulnerability to unauthorized access. What would be desirable is a badging system that automates and streamlines the badge issuance and management processes, reducing reliance on manual intervention and reducing the risk of errors and unauthorized access. What would be desirable are ways to meet daily badging requirements more effectively, ensuring smooth operations and compliance with security standards. What would be desirable are ways to reduce the labor costs associated with manual badging operations and to streamline operational workflows, leading to significant cost savings.

SUMMARY

The present disclosure relates generally to badging systems. More particularly, the present disclosure relates to using artificial intelligence to help automate the creation of badges in a badging system. An example may be found in a method for generating a new or renewed badge for a user of a facility, where the badge includes access rights for physically accessing one or more areas of a facility. The method includes providing a Large Language Model (LLM) with access to one or more databases associated with the facility, such as a Human Resources (HR) database. The LLM is prompted to automatically complete at least part of a badge request form for the new or renewed badge for the user of the facility, wherein the badge request form, once completed and approved, authorizes activation of the new or renewed badge for the user of the facility. In some cases, the badge request form includes two or more information fields, wherein the LLM automatically populates a plurality of the two or more information fields of the badge request form by extracting respective information from the one or more databases associated with the facility (e.g. an HR database).

Another example may be found in a system for generating a new or renewed badge for a requesting user of a facility, where the badge includes access rights for physically accessing one or more areas of the facility. The system includes one or more databases that include user information of a plurality of users of the facility, access rights for the plurality of users of the facility, and one or more user associations and/or relationships between the plurality of users of the facility. A controller is operatively coupled to the one or more databases. The controller is configured to provide a Large Language Model (LLM) access to the one or more databases. The controller is configured to submit one or more prompts to the LLM, prompting the LLM to determine access rights for the requesting user based at least in part on the access rights of the plurality of users of the facility and one or more user associations and/or relationships between the requesting user and one or more of the plurality of users of the facility. The controller is configured to automatically create a badge request for the requesting user that includes the determined access rights.

Another example may be found in a non-transitory computer readable medium storing instructions thereof. When the instructions are executed by one or more processors, the one or more processors are caused to provide a Large Language Model (LLM) with access to one or more databases associated with a facility. The one or more processors are caused to prompt the LLM to automatically complete at least part of a badge request for a requesting user of the facility, wherein the badge request, once completed and approved, authorizes activation of a badge to provide the requesting user access to at least part of the facility. In some cases, the badge request includes two or more information fields, wherein the LLM automatically populates a plurality of the two or more information fields of the badge request by extracting respective information from the one or more databases associated with the facility. The two or more information fields of the badge request may include a name field, an access rights field, an access rights expiration time field, and one or more of: a birth date field, a gender field, a height field, a weight field, a hair color field, an eye color field, a picture field, a national ID number field, a blood type field, a country of citizenship field, a job title field, a job class field, and a work location field. These are just examples.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIGS. 2A and 2B are flow diagrams that together show an illustrative method for generating a new or renewed badge.

Figure 1:
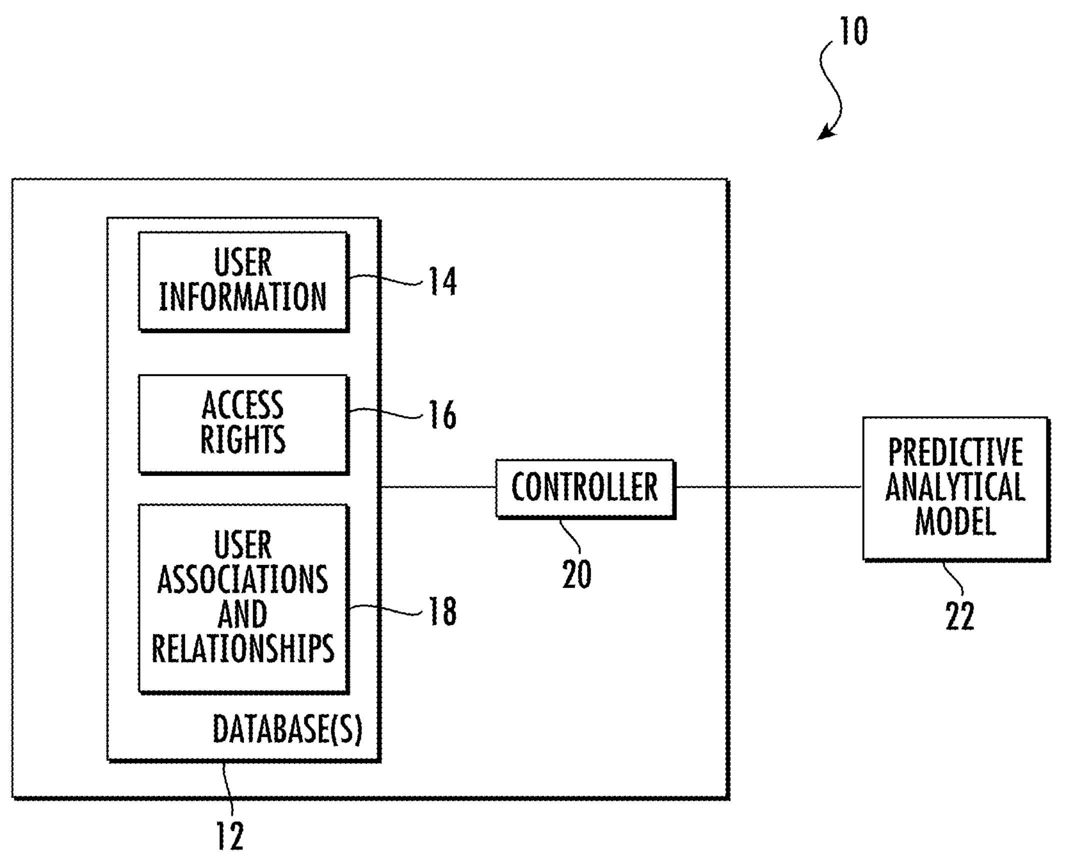
FIG. 1 is a schematic block diagram showing an illustrative system for generating a new or renewed badge.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term “about”, unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms “a”, “an”, and “the” include the plural referents unless the content clearly dictates otherwise. As used in this specification and the appended claims, the term “or” is generally employed in its sense including “and/or” unless the content clearly dictates otherwise.

It is noted that references in the specification to “an embodiment”, “some embodiments”, “other embodiments”, etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative system 10 for generating a new or renewed badge for a requesting user of a facility, wherein the badge includes access rights for physically accessing one or more areas of the facility. The system 10 includes one or more databases 12 that include information that is useful for generating new or renewed badges. The one or more databases 12 may include user information 14 of a plurality of users of the facility, access rights 16 for the plurality of users of the facility, and one or more user associations and/or relationships 18 between the plurality of users of the facility. The user information 14 may include a Human Resources (HR) database that is associated with the facility. The Human Resources (HR) database may include personal information of the users that are associated with the facility. In some cases, the one or more databases 12 may include at least part of an organizational chart of an organization associated with the facility, where the organizational chart identifies one or more supervisors and/or one or more coworkers for each of at least some of the users of the facility. In some cases, the one or more databases 12 may include the access rights currently assigned to at least one of the one or more supervisors and/or one or more of the coworkers of the user. In some cases, the one or more databases 12 may include access logs that log prior accesses by the one or more supervisors and/or the one or more of the coworkers of the user. In some cases, the one or more databases 12 may include access logs that log prior accesses of the user. In some cases, the one or more databases 12 may include communication logs that log communications between users of the facility (e.g. by phone, email, Microsoft TEAMS calls/meetings, etc.). In some cases, the one or more databases 12 may include information fields from prior authorized badge requests forms.

A controller 20 is operatively coupled to the one or more databases 12. The controller 20 is configured to provide a predictive analytical model access to the one or more databases 12. In some cases, the predictive analytical model may be or otherwise include a Large Language Model (LLM) 22. In some cases, a LLM 22 may include one or more predictive analytical models. When an LLM is provided, the controller 20 is configured to submit one or more prompts to the LLM 22, which prompts the LLM 22 to determine access rights for the requesting user based at least in part on the access rights 16 of the plurality of users of the facility and one or more user associations and/or relationships 18 between the requesting user and one or more of the plurality of users of the facility. The controller 20 is configured to automatically create a badge request for the requesting user that includes the determined access rights. In some cases, the two or more information fields of the badge request form may include two or more information fields such as two or more of a name field, an access rights field, an access rights expiration time field, and one or more of: a birth date field, a gender field, a height field, a weight field, a hair color field, an eye color field, a picture field, a national ID number field, a blood type field, a country of citizenship field, a job title field, a job class field, and a work location field. In some cases, the two or more information fields of the badge request form may include a hair color field, and the LLM 22 (which may be a multi-model LLM) may process a picture of the user of the facility and extract the hair color of the user from the picture, and automatically populate the hair color field of the badge request form with the extracted hair color. Eye color, skin color and other physical characteristics of the user may be similarly extracted and automatically added to the badge request form.

In some cases, the controller 20 may be configured to prompt the LLM 22 to identify patterns in prior access events of the plurality of users of the facility and determine access rights 16 for the requesting user based at least in part on the identified patterns in the prior access events of the plurality of users of the facility and the one or more user associations and/or relationships 18 between the requesting user and the one or more of the plurality of users of the facility. In some cases, the controller 20 may be configured to automatically submit the badge request for the requesting user for approval, and once approved, automatically activate a badge for the requesting user providing physically accessing to one or more areas of the facility based on the access rights.

In some cases, the LLM 22 may automatically populate the access rights field for the user with assess rights that are derived from the access rights of one or more supervisors and/or access rights of one or more of the coworkers of the user. In some cases, the LLM 22 may automatically populate the access rights field of the badge request form for the user with assess rights that are derived at least in part from the prior accesses by the one or more supervisors and/or the prior accesses of one or more of the coworkers of the user. In some cases, the LLM 22 may automatically populate the access rights field for the user with assess rights that are derived at least in part from the prior accesses of the user. In some cases, the LLM 22 may automatically populate the access rights field for the user with assess rights that are derived at least in part from the communication logs between users of the facility (e.g. (e.g. communication by phone, email, Microsoft TEAMS calls/meetings, etc.). In some cases, the LLM 22 may automatically suggest changes to one or more of the information fields of the badge request form based at least in part on one or more of the information fields of prior authorized badge requests forms.

Figure 2A:
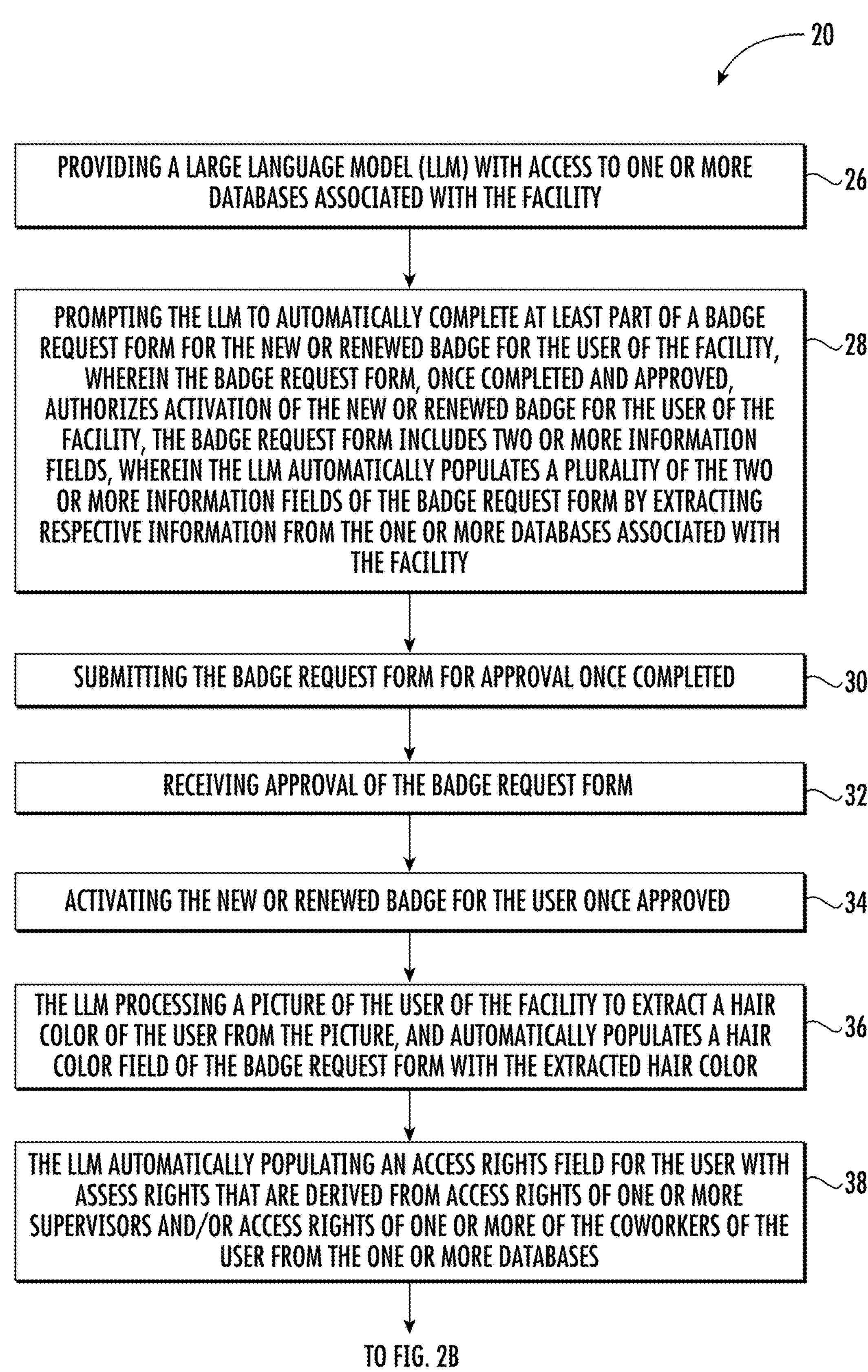

FIGS. 2A and 2B are flow diagrams that together show an illustrative method 24 for generating a new or renewed badge for a user of a facility, the badge including access rights for physically accessing one or more areas of a facility. The illustrative method 24 includes providing a predictive analytical model and/or a Large Language Model (LLM) 22 with access to one or more databases associated with the facility, as indicated at block 26. In this example, an LLM is provided. The LLM is prompted to automatically complete at least part of a badge request form for the new or renewed badge for the user of the facility, wherein the badge request form, once completed and approved, authorizes activation of the new or renewed badge for the user of the facility. The badge request form may include two or more information fields, wherein the LLM automatically populates a plurality of the two or more information fields of the badge request form by extracting and/or determining respective information from the one or more databases associated with the facility, as indicated at block 28. In some cases, the method 24 includes submitting the badge request form for approval once completed, as indicated at block 30. The method 24 may include receiving approval of the badge request form, as indicated at block 32. Approval is often granted manually by authorized security personnel. The new or renewed badge may be activated for the user once approved, as indicated at block 34. In some cases, the new or renewed badge may be automatically approved and activated.

In some cases, the one or more databases may include a Human Resources (HR) database associated with the facility that includes personal information of the user's that are associated with the facility. In some cases, a badge request form may include two or more information fields of the badge request form such as a name field, an access rights field, an access rights expiration time field, and one or more of: a birth date field, a gender field, a height field, a weight field, a hair color field, an eye color field, a picture field, a national ID number field, a blood type field, a country of citizenship field, a job title field, a job class field, and a work location field. The badge request form may include a hair color field. In some cases, the LLM (which may be a multi-model LLM) may process a picture of the user of the facility to extract the hair color of the user from the picture, and automatically populate the hair color field of the badge request form with the extracted hair color, as indicated at block 36.

In some cases, the one or more databases may include at least part of an organizational chart of an organization associated with the facility that identifies one or more supervisors and/or one or more coworkers of at least some of the users of the facility. In some cases, the one or more databases may include the access rights currently assigned to at least one of the one or more supervisors and/or one or more of the coworkers of the user. The method 24 may include the LLM automatically populating the access rights field for the user with assess rights that are derived from the access rights of one or more supervisors and/or access rights of one or more of the coworkers of the user, as indicated at block 38.

Continuing on FIG. 2B, the one or more databases may include access logs that log prior accesses by the one or more supervisors and/or the one or more of the coworkers of the user. The LLM may automatically populate the access rights field of the badge request form for the user with assess rights that are derived at least in part from the prior accesses by the one or more supervisors and/or the prior accesses of one or more of the coworkers of the user, as indicated at block 40. In some cases, for a badge renewal, the one or more databases may include access logs that log prior accesses of the user, and the LLM may automatically populate the access rights field for the user with assess rights that are derived at least in part from the prior accesses of the user, as indicated at block 42. The access rights may be tailored to allow access to only certain areas of the facility and/or only during certain times.

In some cases, the one or more databases may include communication logs that log communications between users of the facility (e.g. communication by phone, email, Microsoft TEAMS calls/meetings, etc.). The LLM may automatically populate the access rights field for the user with assess rights that are derived at least in part from the communication logs between users of the facility, as indicated at block 44. In some cases, the one or more databases may include information fields from prior authorized badge requests forms, and the LLM may automatically suggest changes to one or more of the information fields of the badge request form based at least in part on one or more of the information fields of prior authorized badge requests forms, as indicated at block 46. In some cases, the suggested changes to one or more of the information fields may include a change to comply with a naming convention and/or a format for certain information. In some cases, the suggested changes to one or more of the information fields may include a change to comply with a facility specific naming convention and/or facility specific formats.

In some cases, the one or more databases may include an access rights expiration time for each authorized user of the facility, and the method 24 may include prompting the LLM to estimate a workload for security personnel to generate new and/or renewed badges over a future time period (e.g. over the next week) based at least in part on the access rights expiration time for each of the authorized user of the facility, as indicated at block 48. In some cases, the one or more databases may include an access badge activation time for each authorized user of the facility, and the method 24 may include prompting the LLM to estimating a rate at which badges can be processes based at least in part on the access badge activation time for at least some of the authorized users of the facility, as indicated at block 50.

Figure 3:
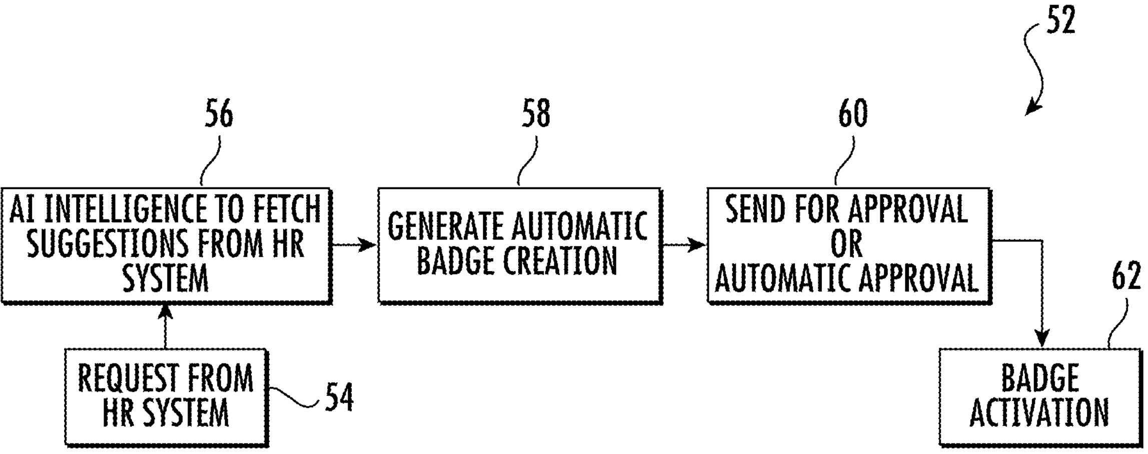
FIG. 3 is a flow diagram showing an illustrative method for generating a new or renewed badge.

FIG. 3 is a flow diagram showing an illustrative method 52 for generating a new or renewed badge. The illustrative method 52 starts with a request from HR (Human Resources) for a badge to be generated, as indicated at block 54. AI (Artificial Intelligence) may be used to search HR data sources such as various databases for information that is relevant to generating the new or renewed badge, as indicated at block 56. The badge is created, as indicated at block 58. The badge needs to be approved, as indicated at block 60. This may include manual approval, such as by an authorized person reviewing the badge request. This may include automatic approval, such as by the HR system or the system creating the badge. The badge is then activated, as indicated at block 62.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for generating a new or renewed badge for a user of a facility, the badge including access rights for physically accessing one or more areas of a facility, the method comprising:

providing a Large Language Model (LLM) with access to one or more databases associated with the facility; and prompting the LLM to automatically complete at least part of a badge request form for the new or renewed badge for the user of the facility, wherein the badge request form, once completed and approved, authorizes activation of the new or renewed badge for the user of the facility, the badge request form includes two or more information fields, wherein the LLM automatically populates a plurality of the two or more information fields of the badge request form by extracting respective information from the one or more databases associated with the facility;

wherein the one or more databases include an access rights expiration time for each authorized user of the facility; and the method further comprises prompting the LLM to estimate a workload for generating new and/or renewed badges over a future time period based at least in part on the access rights expiration time for each of the authorized user of the facility.

2. The method of claim 1, comprising:

submitting the badge request form for approval once completed;

receiving approval of the badge request form; and activating the new or renewed badge for the user once approved.

3. The method of claim 1, wherein the one or more databases include a human resources database associated with the facility, wherein the human resources database includes personal information of the user's that are associated with the facility.

4. The method of claim 3, wherein the two or more information fields of the badge request form include a name field, an access rights field, an access rights expiration time field, and one or more of: a birth date field, a gender field, a height field, a weight field, a hair color field, an eye color field, a picture field, a national ID number field, a blood type field, a country of citizenship field, a job title field, a job class field, and a work location field.

5. The method of claim 4, wherein the two or more information fields of the badge request form include a hair color field, and wherein the LLM processes a picture of the user of the facility to extract the hair color of the user from the picture, and automatically populates the hair color field of the badge request form with the extracted hair color.

6. The method of claim 4, wherein the one or more databases include at least part of an organizational chart of an organization associated with the facility, wherein the organizational chart identifies one or more supervisors and/or one or more coworkers of at least some of the users of the facility.

7. The method of claim 6, wherein the one or more databases includes the access rights currently assigned to at least one of the one or more supervisors and/or one or more of the coworkers of the user, and wherein the LLM automatically populates the access rights field for the user with assess rights that are derived from the access rights of one or more supervisors and/or access rights of one or more of the coworkers of the user.

8. The method of claim 6, wherein the one or more databases include access logs that log prior accesses by the one or more supervisors and/or the one or more of the coworkers of the user, wherein the LLM automatically populates the access rights field of the badge request form for the user with assess rights that are derived at least in part from the prior accesses by the one or more supervisors and/or the prior accesses of one or more of the coworkers of the user.

9. The method of claim 4, wherein for a badge renewal, the one or more databases include access logs that log prior accesses of the user, and wherein the LLM automatically populates the access rights field for the user with assess rights that are derived at least in part from the prior accesses of the user.

10. The method of claim 4, wherein the one or more databases include communication logs that log communications between users of the facility, and wherein the LLM automatically populates the access rights field for the user with assess rights that are derived at least in part from the communication logs between users of the facility.

11. The method of claim 1, wherein the one or more databases include information fields from prior authorized badge requests forms, and wherein the LLM automatically suggests changes to one or more of the information fields of the badge request form based at least in part on one or more of the information fields of prior authorized badge requests forms.

12. The method of claim 11, wherein the suggested changes to one or more of the information fields comprise a change to comply with a naming convention and/or format.

13. The method of claim 11, wherein the suggested changes to one or more of the information fields comprise a change to comply with a facility specific naming convention.

14. A method for generating a new or renewed badge for a user of a facility, the badge including access rights for physically accessing one or more areas of a facility, the method comprising:

providing a Large Language Model (LLM) with access to one or more databases associated with the facility; and prompting the LLM to automatically complete at least part of a badge request form for the new or renewed badge for the user of the facility, wherein the badge request form, once completed and approved, authorizes activation of the new or renewed badge for the user of the facility, the badge request form includes two or more information fields, wherein the LLM automatically populates a plurality of the two or more information fields of the badge request form by extracting respective information from the one or more databases associated with the facility; wherein the one or more databases include an access badge activation time for each authorized user of the facility, the method further comprising:

prompting the LLM to estimate a rate at which badges can be processed based at least in part on the access badge activation time for at least some of the authorized users of the facility.

15. A system for generating a new or renewed badge for a requesting user of a facility, the badge including access rights for physically accessing one or more areas of the facility, the system comprising:

one or more databases that include user information of a plurality of users of the facility, access rights for the plurality of users of the facility, and one or more user associations and/or relationships between the plurality of users of the facility;

a controller operatively coupled to the one or more databases, the controller configured to:

provide a Large Language Model (LLM) access to the one or more databases;

submit one or more prompts to the LLM, prompting the LLM to determine access rights for the requesting user based at least in part on the access rights for the plurality of users of the facility and one or more user associations and/or relationships between the requesting user and one or more of the plurality of users of the facility; and automatically create a badge request for the requesting user that includes the determined access rights;

wherein the one or more databases include an access rights expiration time for each authorized user of the facility, the controller further configured to prompt the LLM to estimate a workload for generating new and/or renewed badges over a future time period based at least in part on the access rights expiration time for each of the authorized user of the facility.

16. The system of claim 15, wherein the one or more databases include access logs that log prior access events of the plurality of users of the facility, and wherein the controller is configured to prompt the LLM to identify patterns in prior access events of the plurality of users of the facility and determine access rights for the requesting user based at least in part on the identified patterns in the prior access events of the plurality of users of the facility and the one or more user associations and/or relationships between the requesting user and the one or more of the plurality of users of the facility.

17. The system of claim 15, wherein the controller is configured to automatically submit the badge request for the requesting user for approval, and one approved, automatically activating a badge for the requesting user providing physically accessing to one or more areas of the facility based on the access rights.

* * * * *